Figure 1:
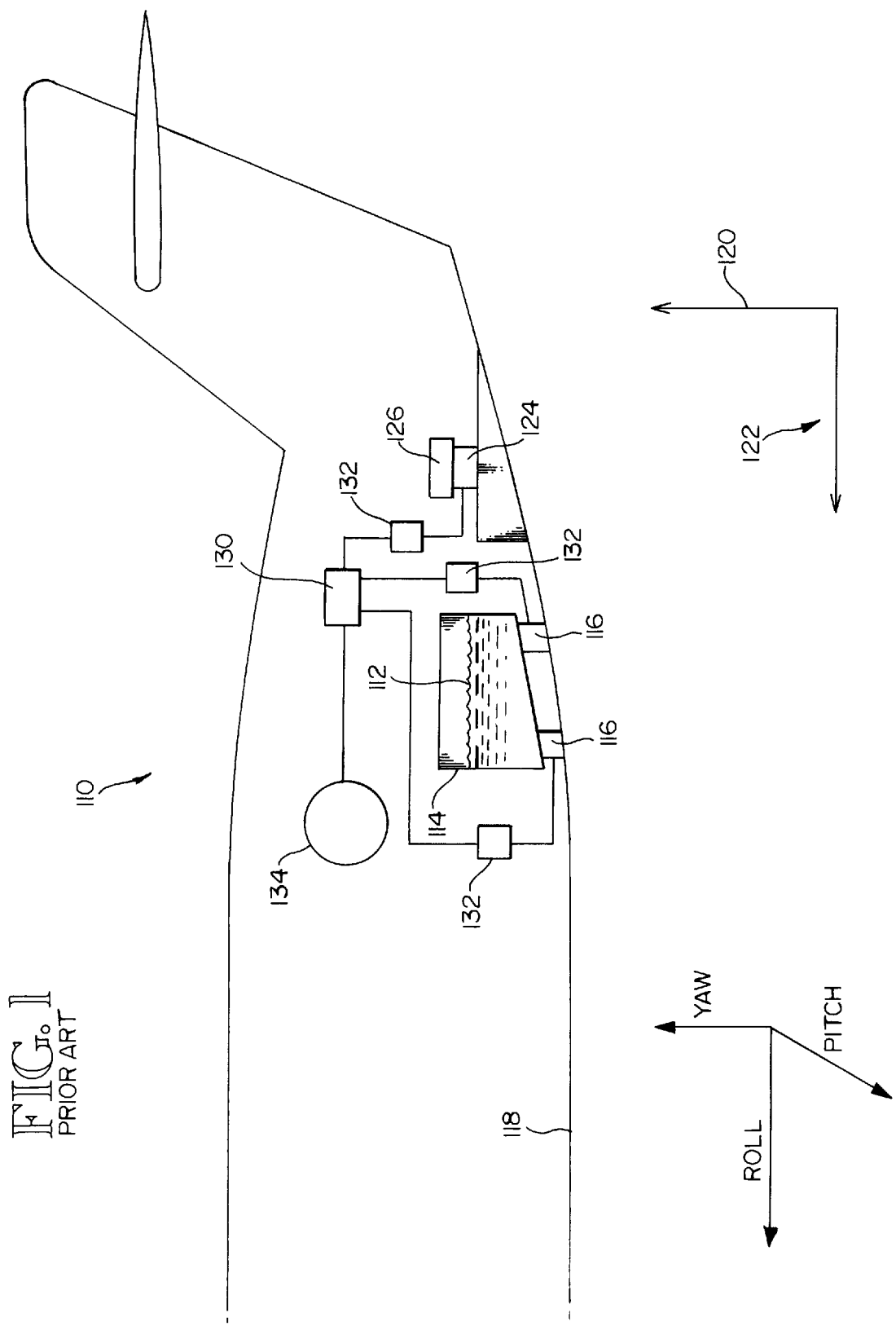
Figure 3A:
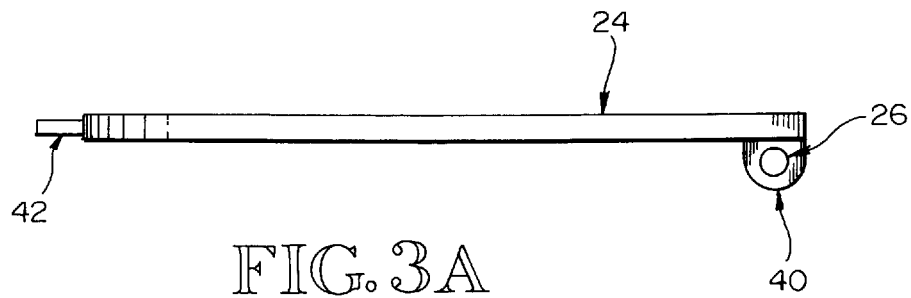
Figure 3B:
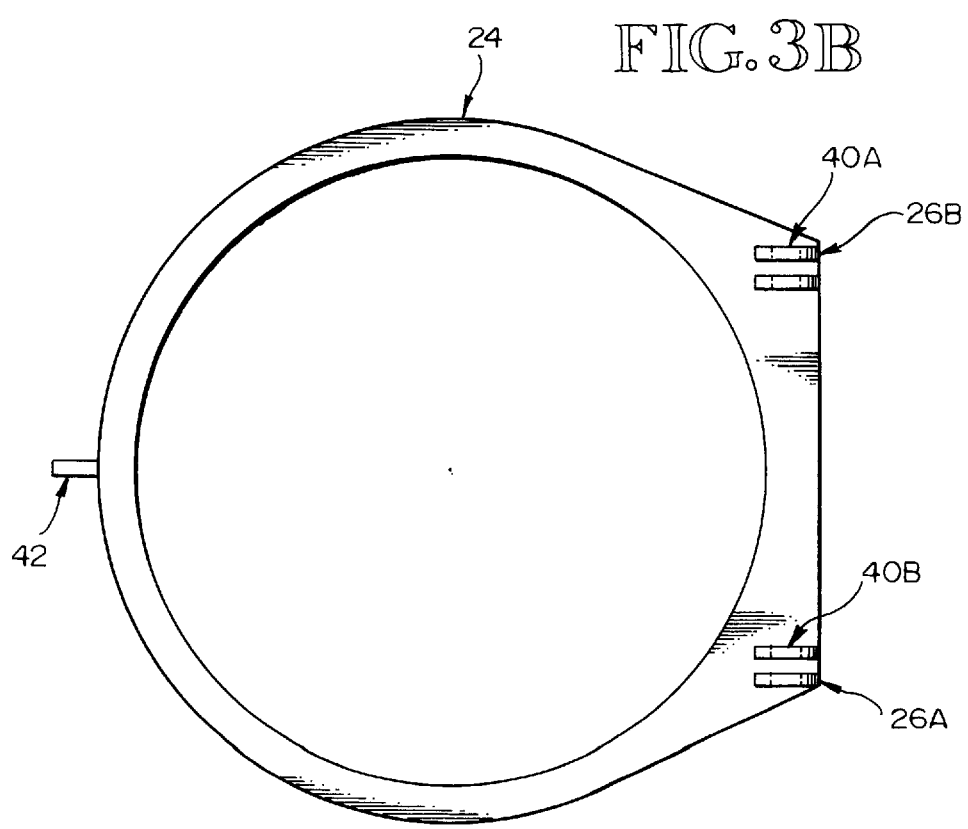
Figure 4:
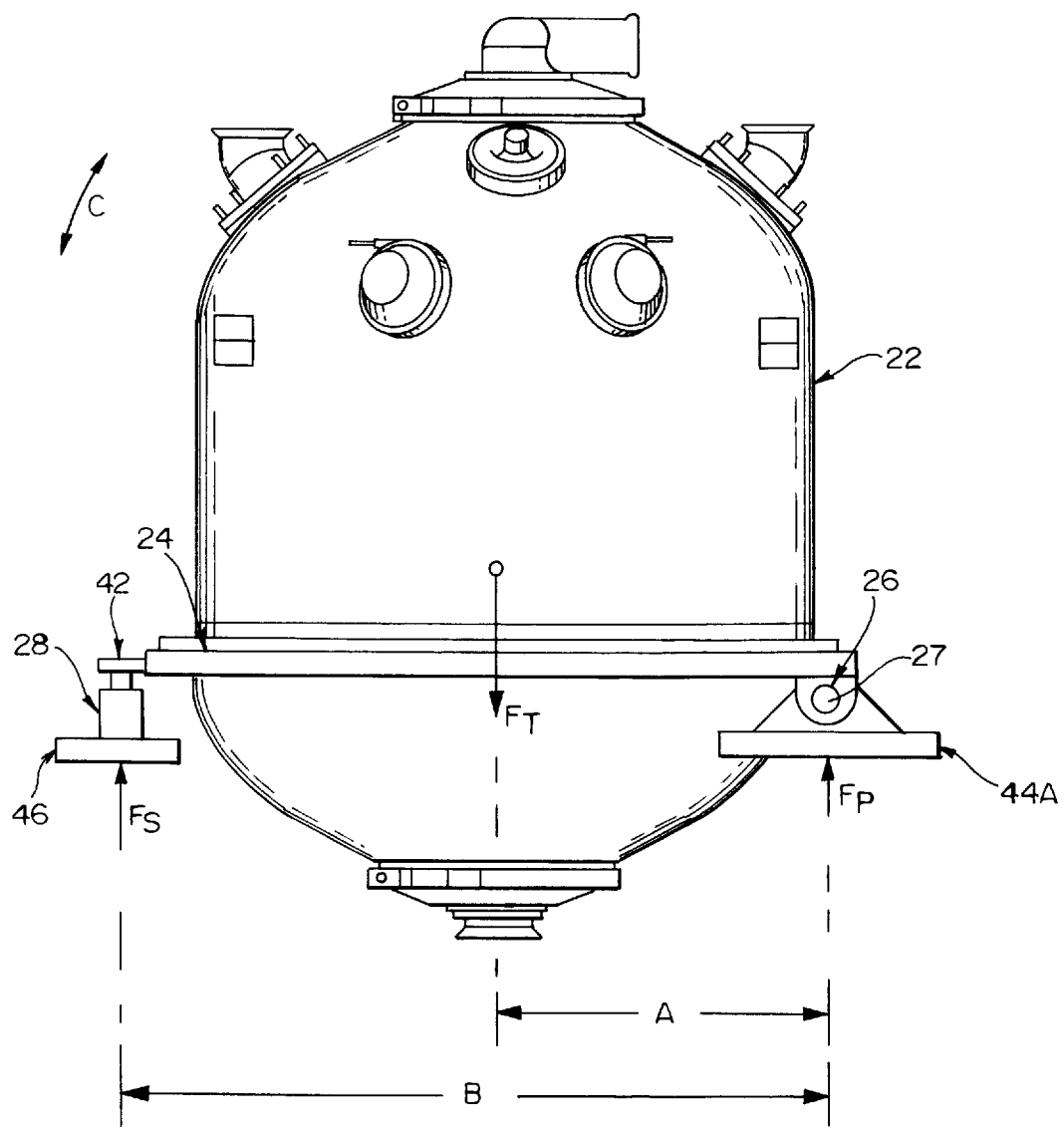

United States Patent [19]
Wierenga

[11] Patent Number: 5,850,757
[45] Date of Patent: Dec. 22, 1998

[54] APPARATUS FOR MEASURING THE AMOUNT OF LIQUID IN A TANK MOUNTED WITHIN A VEHICLE BY MEASURING THE TANK PIVOT CELL AND INCLINOMETER

[75] Inventor: Scott M. Wierenga, Everett, Wash.

[73] Assignee: The Boeing Company, Seattle, Wash.

[21] Appl. No.: 910,193

[22] Filed: Aug. 12, 1997

[51] Int. Cl.⁶ .................................................. G01F 23/20
[52] U.S. Cl. ............................ 73/296; 73/426; 177/257; 177/245
[58] Field of Search ............................ 73/296, 149, 426; 177/229, 136, 141, 245, 256–259

[56] References Cited

U.S. PATENT DOCUMENTS

| | | | |
|---|---|---|---|
| 4,063,605 | 12/1977 | Graham | 117/225 |
| 4,375,839 | 3/1983 | Manning et al. | 73/296 X |
| 4,562,732 | 1/1986 | Kitagawa et al. | 73/291 |
| 5,133,212 | 7/1992 | Grills et al. | 73/296 |
| 5,604,938 | 2/1997 | Tyler | 4/321 |
| 5,714,695 | 2/1998 | Bruns | 73/862.641 |

*Primary Examiner*—Joseph L. Felber
*Attorney, Agent, or Firm*—Lawrence W. Nelson

[57] ABSTRACT

An apparatus for measuring the amount of liquid in a tank mounted within a vehicle. The apparatus includes a tank-mount mechanically coupled to and surrounding the tank to prevent translational movement of the tank, The tank-mount has a plurality of pivoting members allowing only rotational movement of the tank. The members pivot about a common axis, defined by an orifice of each of a plurality of fixed members coupled to the vehicle. The tank-mount also has an extended end positioned on a side opposite to the plurality of pivoting members which extends outwardly from the tank. The apparatus also includes a load cell in contact with the extended end for providing a signal proportional to the load placed on the load cell by the extended end.

2 Claims, 4 Drawing Sheets

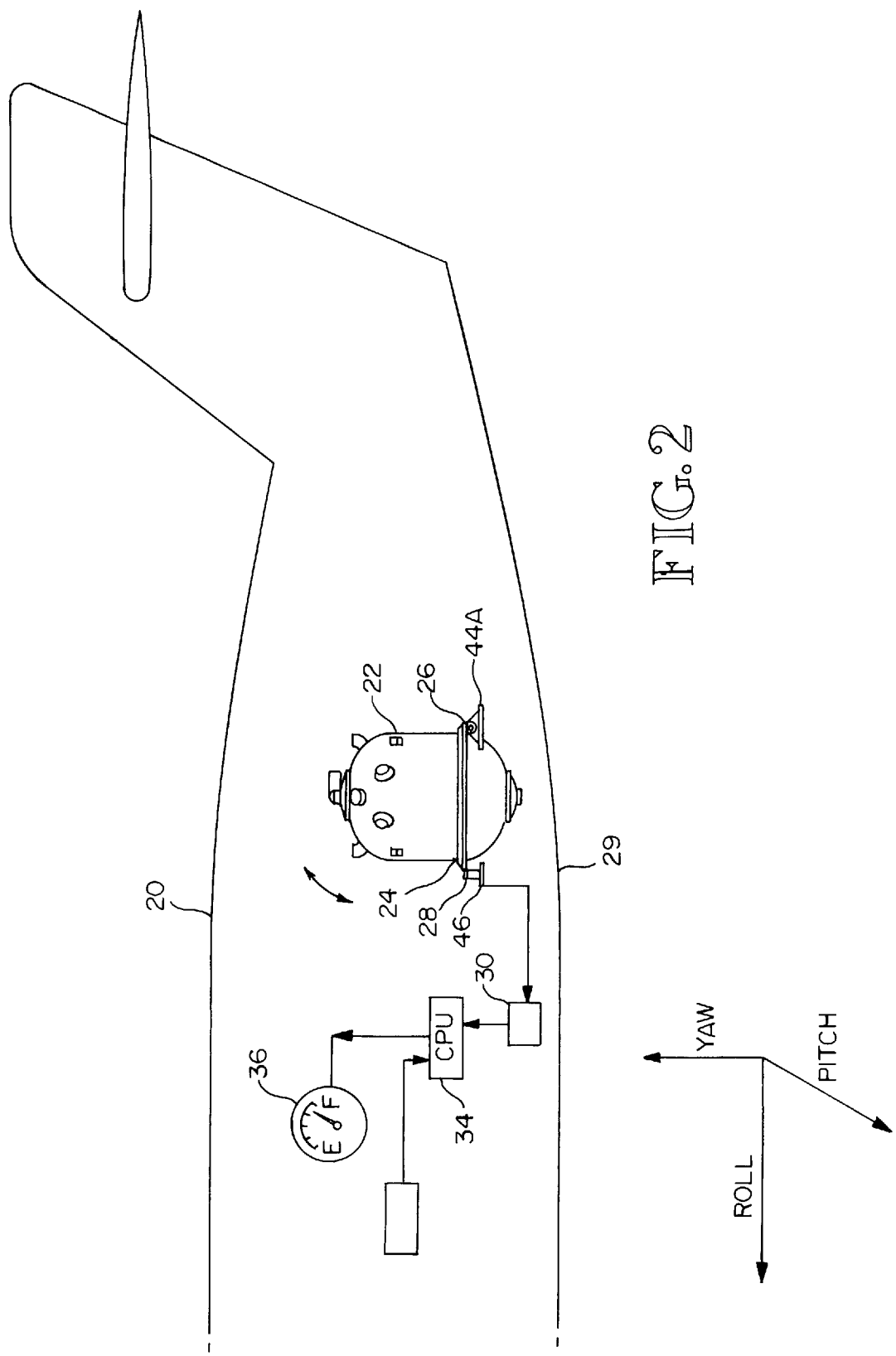

APPARATUS FOR MEASURING THE AMOUNT OF LIQUID IN A TANK MOUNTED WITHIN A VEHICLE BY MEASURING THE TANK PIVOT CELL AND INCLINOMETER

BACKGROUND OF THE INVENTION

Field of the Invention

The present invention relates to an apparatus for measuring a quantity of fluid within a tank, and, more particularly, to an apparatus for measuring the quantity and level of fluid in the tank by measuring the weight of the tank.

Background Information

BRIEF DESCRIPTION OF THE ART

The present invention is directed toward a system for measuring the quantity of fluid in a tank located within an aircraft or other type of moving vehicle. FIG. 1 shows a prior art measurement system 110 for measuring fluid 112 within a tank 114. The tank 114 may be a waste holding tank or a fuel tank, such as found in aircraft or other moving vehicles. A plurality of strain-gauge load cells 116, which provide analog voltage outputs that correspond proportionally to the load forces applied to cells 116, are positioned between the tank 114 and a common reference surface 118. The tank load cells 116 are positioned at all the mounting points for the tank 114, which typically totals four separate locations beneath the tank 114.

A reference strain-gauge load cell 124 is placed between a reference standard 126 of known weight and the common reference surface 118. The reference load cell 124 provides an analog voltage output in proportion to the load placed on the load cell 124 by the reference standard 126. The reference load cell 124 is also aligned to be sensitive to load forces generally parallel along an axis 120 which is substantially normal to the common reference surface 118 which is parallel along axis 122.

A Central Processing Unit (CPU) 130, is coupled to receive the analog voltage output from the load cells 116 and the reference load cell 124, and it converts these analog signals into output information on the level of the fluid 112 in the tank 114. An averaging device 132 electrically averages out short term transients appearing in the analog voltage output signals from the load cells 116. The CPU 130 invokes a program that adds the read-outs from the plurality of the load cells 116, and then divides this amount by the G-force, which is determined by the reference load cell 124. Finally, a read-out device 134, such as an analog dial, LCD or LED display, is operatively linked to the CPU 130 for displaying the level of the fluid 112 contained in the tank 114.

To properly measure the weight of the tank 114, the plurality of the load cells 116 are mounted along a plurality of points between the tank 116 and the reference surface 118. The requirement to process a plurality of signals from multiple load cells 116 and perform compensating operations based on the output of a specific reference load cell, such as the load cell 124, can increase the likelihood of errors and will increase maintenance costs, as well as increase CPU processing requirements. Accordingly, there is a need in the art for a fluid-level measuring system which is simple and has fewer parts requiring maintenance.

SUMMARY OF THE INVENTION

In one aspect, the present invention relates to an apparatus for measuring the amount of liquid in a tank mounted within a vehicle. The apparatus includes a tankmount mechanically coupled to and surrounding the tank to prevent translational movement of the tank. The tank-mount includes a plurality of pivoting members allowing only rotational movement of the tank. The members pivot about a common axis, defined by an orifice of each of a plurality of fixed members coupled to the vehicle. The tank mount also includes an extended end that is positioned on a side opposite to the plurality of pivoting members, and which extends outwardly from the tank. The apparatus also includes a load cell in contact with the extended end for providing a signal proportional to the load placed on the load cell by the extended end.

BRIEF DESCRIPTION OF THE DRAWINGS

These and other features, aspects, and advantages of the present invention will become better understood with regard to the following descriptions, appended claims, and accompanying drawings where:

FIG. 1 shows a schematic diagram of a prior art apparatus for measuring the liquid level in a tank;

FIG. 2 shows a schematic diagram of an apparatus for measuring the level of fluid in a tank according to the present invention;

FIG. 3A shows a side view of a tank-mount of the apparatus for measuring the level of fluid in the tank;

FIG. 3B shows a bottom view of the tank-mount; and

FIG. 4 shows a side view of the tank and the pivoting tank-mount of the apparatus for measuring the quantity of fluid in the tank.

DESCRIPTION OF A PREFERRED EMBODIMENT

Referring to the drawings, FIG. 2 shows, in schematic diagram, an apparatus 20 for measuring the quantity of fluid in a tank 22 by measuring the weight of the tank 22 in a simple, easily maintainable manner.

The apparatus 20 includes a cantilevered tank-mount 24, shown in FIGS. 3A and 3B, which is part of the tank 22 or mechanically coupled to the tank 22, and pivotally mounted at first and second pivot points, 26A and 26B, respectively. The pivot points 26A and 26B work like hinges to limit the tank 22 to rotational motion about a shared axis defined by a first and second aligned axis 40A and 40B of the two pivot points 26A and 26B, respectively. The tank-mount 24 also includes an extended end 42, positioned opposite the first and second pivot points 26A and 26B, that engages a single load cell 28, as shown in FIG. 2. The single load cell 28 provides an analog voltage signal that directly corresponds to the static load forces applied by the extended end 42. The signal is processed by a filtering device 30, which is well known in the art, in electrical communication with the load cell 28. The apparatus 20 also includes a CPU 34 in electrical communication with the filtering device 30. The CPU 34 processes signals from the filter 30 and an inclinometer 32 and outputs a fluid level of the tank 22 on a display device 36.

FIG. 4 shows one embodiment of the tank 22 of the apparatus 20. The tank-mount 24 is fastened about the pivot points 26A and 26B which are rotatingly engaged via pins 27A and 27B in an orifice of first and second fixed structures 44A and 44B. This limits the movement of the tank 22 to rotation about the pins 27A and 27B which are aligned along the common X axis. Thus, only movement and transient forces along the path of rotation C can be detected by the load cell 28. All other influences are mechanically eliminated. The fixed structures 44A and 44B hold the tank 22 up at the pivot points 26A and 26B by applying a force $F_p$ away from the aircraft body 29, shown in FIG. 2.

The load cell 28 is structurally connected to a second fixed structure 46, which is preferably coupled to the aircraft body 29, thereby keeping the cell 28 in a fixed position relative to the extended end 42, which rests upon the load cell 28 in a static state. The use of a single load-cell 28, which is installed opposite to the pivot points 26A and 26B makes the load-cell 28 easy to install, replace, and maintain. Thus, a large cost savings may be realized by using the apparatus 20 instead of prior art devices. Further, the tank 22 may contain sewage, and an easily maintainable system may reduce health hazards potentially caused by long term exposure to this type of environment. Further, the processing of a single signal is faster and requires a less complex processing means.

A force $F_s$ is applied to the sensing load cell 28 by the extended end 42 and it is proportional to the weight of the tank 22. The force $F_T$ (the weight of the tank) can be calculated by using the distance A of the pivot points 26A and 26B from the center of gravity $F_T$ of the tank 22, and the distance B of the pivot points 26 from the load cell 28 where:

$$F_s = (A/B) \times (F_T), \text{ and where } F_T = F_s (B/A).$$

Since distances A and B are known values for the installation, the relationship between the force $F_s$, measured by the sensing load cell 28, and the weight of the fluid in the tank can be easily calculated. Further, the weight of the fluid is linearly proportional to the volume of the fluid, which can be used to determine the fluid level or what percentage of the tank 22 is filled. Thus, by measuring the force $F_s$ at the load cell 28, the weight, quantity and level of the fluid within the tank 22 can be calculated.

The electrical output of load cell 28, which is proportional to the force $F_s$, is received by a filter 30 for filtering out transient signals due to extraneous events such as jolts in an airplane due to turbulence. This filtered signal is then transmitted from the filter 30 to the CPU 34, which uses the equation: $F_T = (B/A) \times F_s$ to determine the weight $F_T$ of and hence the volume and fluid level of the tank 22. The CPU 34 outputs this level to the display 36.

When the tank is at an angle other than horizontal, the distance A between the center of gravity and the pivot point varies as the tank is filled. In a preferred embodiment, the CPU is electronically coupled to an inclinometer 32 which senses the change in the angle of attack of the airplane. This angle is then communicated to the CPU 34 which adjusts the relationship between total weight of fluid and force registered by the load cell 28 accordingly. This may be accomplished by a "look-up table" contained in the CPU which relates the force registered by the load cell 28 to the total weight of the fluid for each anticipated angle.

Accordingly, the present invention provides a simple and easily maintainable apparatus for measuring the fluid level within a moving vehicle without the need of multiple load cell sensors or the need to process multiple signals.

Except as otherwise disclosed herein, various components shown in outline or block form are individually well-known and their internal construction is not critical either to the making or the using of this invention, or to the description of the best mode of the invention.

While the detailed description above has been expressed in terms of specific examples, those skilled in the art will appreciate that many other configurations could be used to accomplish the purpose of the disclosed inventive apparatus. Accordingly, it will be appreciated that various modifications of the above-described embodiments may be made without departing from the spirit and scope of the invention. Therefore, the invention is to be limited only by the following claims.

What is claimed is:

1. An apparatus for measuring the amount of liquid in a tank mounted within a vehicle, said apparatus comprising:

a tank-mount mechanically coupled to and surrounding said tank to prevent translational movement of said tank, said tank-mount including a plurality of pivoting members allowing only rotational movement of said tank, said members pivoting about a common axis, defined by an orifice of each of a plurality of fixed members that are mechanically coupled to the vehicle. and an extended end positioned on a side opposite to said plurality of pivoting members which extends outwardly from said tank;

a load cell in contact with said extended end for providing a first signal proportional to a force $F_s$ placed on said load cell by said extended end;

a Central Processing Unit in electrical communication with said load cell, and which processes the first signal from said load cell and calculates the amount of the liquid in said tank based on the force $F_s$ on said load cell, a distance A from the center of gravity of said tank to the common axis, and a distance B from the common axis to where said extended end applies the load $F_s$ to said load cell such that the actual weight FT of the tank and the fluid is calculated by the equation $FT = (B/A) \times (F_s)$; and an inclinometer electrically coupled to said Central Processing Unit, said inclinometer transmitting a second signal to said Central Processing Unit directly proportional to the angle of inclination of the vehicle, wherein said Central Processing Unit processes the second signal and adjusts the relationship between the total weight of said tank and the force registered by the load cell accordingly.

2. The apparatus according to claim 1 wherein said apparatus further comprises a transient filter electrically connected between said load cell and said Central Processing Unit to remove variations in the signal caused by sudden movement of the vehicle.

* * * * *